US011558222B2

(12) United States Patent
Zheng et al.

(10) Patent No.: US 11,558,222 B2
(45) Date of Patent: Jan. 17, 2023

(54) METHOD AND RECEIVER DEVICE FOR CHANNEL ESTIMATION OF BROADCAST CHANNEL

(71) Applicant: Telefonaktiebolaget LM Ericsson (publ), Stockholm (SE)

(72) Inventors: Yanli Zheng, Beijing (CN); Hai Wang, Ottawa (CA); Zhipeng Lin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 17/258,042

(22) PCT Filed: Apr. 30, 2019

(86) PCT No.: PCT/CN2019/085318
§ 371 (c)(1),
(2) Date: Jan. 5, 2021

(87) PCT Pub. No.: WO2020/010905
PCT Pub. Date: Jan. 16, 2020

(65) Prior Publication Data
US 2021/0176097 A1 Jun. 10, 2021

(30) Foreign Application Priority Data

Jul. 12, 2018 (WO) ................ PCT/CN2018/095518

(51) Int. Cl.
*H04L 25/02* (2006.01)
*H04J 11/00* (2006.01)
(Continued)

(52) U.S. Cl.
CPC ...... *H04L 25/0232* (2013.01); *H04J 11/0073* (2013.01); *H04J 11/0076* (2013.01);
(Continued)

(58) Field of Classification Search
CPC . H04L 25/0224; H04L 5/0051; H04L 5/0048; H04L 25/0232; H04J 11/0073;
(Continued)

(56) References Cited

U.S. PATENT DOCUMENTS

2011/0096680 A1 4/2011 Lindoff et al.
2019/0379562 A1* 12/2019 Rane ..................... H04L 25/022
(Continued)

FOREIGN PATENT DOCUMENTS

WO 2017034296 A1 3/2017

OTHER PUBLICATIONS

International Search Report and Written Opinion of the International Searching Authority for PCT International Application No. PCT/CN2019/085318 dated Jul. 29, 2019.
(Continued)

*Primary Examiner* — Shukri Taha
(74) *Attorney, Agent, or Firm* — Sage Patent Group

(57) ABSTRACT

A method and a receiver device are disclosed for channel estimation of a broadcast channel. According to an embodiment, the receiver device determines a first channel estimation of demodulation reference signal (DMRS) from a transmitter device. The receiver device determines a second channel estimation of one or more synchronization related reference signals from the transmitter device. The receiver device determines a final channel estimation of a broadcast channel from the transmitter device based at least on the first and second channel estimations.

20 Claims, 11 Drawing Sheets

(51) Int. Cl.
  *H04L 5/00* (2006.01)
  *H04W 72/00* (2009.01)
  *H04W 92/18* (2009.01)
(52) U.S. Cl.
  CPC ......... *H04L 5/0048* (2013.01); *H04W 72/005* (2013.01); *H04W 92/18* (2013.01)
(58) Field of Classification Search
  CPC . H04J 11/0076; H04W 72/005; H04W 48/12; H04W 88/02; H04W 92/18; H04W 88/08
  See application file for complete search history.

(56) References Cited

U.S. PATENT DOCUMENTS

2020/0367242 A1* 11/2020 Moon .................... H04L 5/0053
2022/0159693 A1*  5/2022 Zhou ................. H04W 72/1273

OTHER PUBLICATIONS

Sony, "Discussion on NR-PBCH Reference Sequence Design," R1-1708256, 3GPP TSG RAN WG1 NR Meeting #89, Hangzhou, P.R.China May 15-19, 2017, 3 pages.
CATT, "SS Burst Set Composition and SS Block Configuration," R1-1710023, 3GPP TSG RAN WG1 NR Ad Hoc#2, Qingdao, China Jun. 27-30, 2017, 5 pages.
Extended European Search Report for European Application No. 19833667.9, dated Mar. 17, 2022, 12 pages.
Interdigital Inc: "On Remaining Details of Synchronization Signal Designs," 3GPP TSG RAN WG1 Meeting 91, Reno, USA, Nov. 27-1, 2017, 8 pages.

* cited by examiner

METHOD AND RECEIVER DEVICE FOR CHANNEL ESTIMATION OF BROADCAST CHANNEL

CROSS REFERENCE TO RELATED APPLICATIONS

This application is a 35 U.S.C. § 371 national stage application of PCT International Application No. PCT/CN2019/085318 filed on Apr. 30, 2019, which itself is a continuation of PCT International Application No. PCT/CN2018/095518, filed Jul. 12, 2018, the disclosures and contents of which are incorporated by reference herein in their entireties.

TECHNICAL FIELD

Embodiments of the disclosure generally relate to wireless communication, and, more particularly, to a method and a receiver device for channel estimation of a broadcast channel.

BACKGROUND

This section introduces aspects that may facilitate better understanding of the present disclosure. Accordingly, the statements of this section are to be read in this light and are not to be understood as admissions about what is in the prior art or what is not in the prior art.

In order to connect to a network, a device needs to acquire network sync and obtain essential system information (SI). Sync signals are used for adjusting the frequency of the device relative to the network, and for finding proper timing of the received signal from the network. In new radio (NR), the synchronization and access procedure involves the following signals. Primary synchronization signal (PSS) allows for network detection in the presence of a high initial frequency error, up to tens of ppm (parts-per-million). Secondary synchronization signal (SSS) allows for more accurate frequency adjustments and channel estimation while at the same time providing fundamental network information, e.g. cell identity (ID). Physical broadcast channel (PBCH) provides a subset of the minimum system information for random access and configurations for fetching remaining minimum system information (RMSI). It will also provide timing information within a cell, e.g. to separate timing between beams transmitted from a cell. The amount of information to fit into the PBCH is highly limited to keep the size down. Furthermore, demodulation reference signal (DMRS) is interleaved with PBCH resources to receive it properly.

A synchronization signal (SS) and PBCH block (SS/PBCH block, or SSB in shorter format) comprises the above signals (PSS, SSS and PBCH DMRS) and PBCH. The SSB may have 15 kHz, 30 kHz, 120 kHz or 240 kHz subcarrier spacing (SCS). The remaining minimum system information (RMSI) is carried in physical downlink shared channel (PDSCH) scheduled by physical downlink control channel (PDCCH) in NR, and contains remaining minimum system information, e.g. the bit map of the actually transmitted SS/PBCH blocks. The RMSI can have 15 kHz, 30 kHz, 60 kHz or 120 kHz SCS.

FIG. 1 is a diagram showing an SS block in NR. As shown, totally 4 orthogonal frequency division multiplexing (OFDM) symbols are used for PBCH, PSS and SSS transmission. The PSS is defined to be 127 subcarriers wide whereas the whole SS block is supposed to be 240 subcarriers wide. A number of SS/PBCH blocks constitute an SS burst set. FIG. 2 is a diagram showing the transmission of an SS burst set. FIG. 3 is a diagram showing the transmission of SS/PBCH blocks in slots. The frequencies shown in FIGS. 2 and 3 refer to SCS and the parameter L refer to the number of SS blocks transmitted in a half frame. As shown, the SS burst set is transmitted periodically. By using the SS blocks in the SS burst set, the UE can determine the downlink timing, frequency offset and acquire some fundamental system information (e.g. RMSI configuration) from the PBCH.

After SS detection, a UE acquires the frequency sync and timing sync in symbol level. To acquire frame level synchronization and get the essential SI, it is needed to do PBCH demodulation and decoding. The demodulation performance is mainly decided by the accuracy of channel estimation.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide improved solutions for channel estimation of a broadcast channel.

According to a first aspect of the disclosure, there is provided a method implemented at a receiver device. The method comprises determining a first channel estimation of DMRS from a transmitter device. The method further comprises determining a second channel estimation of one or more synchronization related reference signals from the transmitter device. The method further comprises determining a final channel estimation of a broadcast channel from the transmitter device based at least on the first and second channel estimations.

In an embodiment of the disclosure, the receiver device is a base station and the transmitter device is another base station. The broadcast channel is physical sidelink broadcast channel (PSBCH).

In an embodiment of the disclosure, the receiver device is a terminal device and the transmitter device is a base station. One or more synchronization related reference signals are at least one of PSS and SSS. The broadcast channel is PBCH.

In an embodiment of the disclosure, the PSS, the SSS and the PBCH are contained in a signal block for cell searching.

In an embodiment of the disclosure, the signal block for cell searching is a synchronization signal block (SSB) in NR.

In an embodiment of the disclosure, the signal block for cell searching comprises multiple symbols in time domain and each of the multiple symbols can be divided into one or more segments in the same manner in frequency domain. Determining the first channel estimation comprises determining, for a first at least one symbol of the multiple symbols, a first channel estimation of DMRS. Determining the second channel estimation comprises determining, for a second at least one symbol of the multiple symbols, a second channel estimation of at least one of the PSS and the SSS. Determining the final channel estimation comprises determining, for the first at least one symbol, a first interpolation between values of the first channel estimation. Determining the final channel estimation comprises determining, for each of the one or more segments, a weighted average of the first channel estimation and the first interpolation for the first at least one symbol and the second channel estimation for the second at least one symbol.

In an embodiment of the disclosure, the first at least one symbol and the second at least one symbol overlap with each other or are different with each other.

In an embodiment of the disclosure, each of a weight for the first channel estimation/the first interpolation and a weight for the second channel estimation equals to one divided by a size of a union set of the first at least one symbol and the second at least one symbol.

In an embodiment of the disclosure, a weight for the first channel estimation/the first interpolation corresponding to a segment of a symbol in the first at least one symbol is based on a density of DMRS in the segment and an amplitude of DMRS in the segment. A weight for the second channel estimation corresponding to a segment of a symbol in the second at least one symbol is based on a density of PSS or SSS in the segment and an amplitude of PSS or SSS in the segment.

In an embodiment of the disclosure, a weight for the first channel estimation/the first interpolation corresponding to a segment of a symbol in the first at least one symbol equals to a ratio between a sum of amplitudes of all DMRS in the segment of the symbol and a sum of amplitudes of all reference signals in the segment of the first at least one symbol and the second at least one symbol. A weight for the second channel estimation corresponding to a segment of a symbol in the second at least one symbol equals to a ratio between a sum of amplitudes of all PSS or SSS in the segment of the symbol and a sum of amplitudes of all reference signals in the segment of the first at least one symbol and the second at least one symbol.

In an embodiment of the disclosure, determining the weighted average comprises adjusting a weight for the first channel estimation/the first interpolation and a weight for the second channel estimation based on a mobile status of the terminal device.

In an embodiment of the disclosure, the first at least one symbol and the second at least one symbol share a common third symbol. Determining the first channel estimation comprises determining a first channel estimation of DMRS in a first segment of the third symbol. Determining the second channel estimation comprises determining a second channel estimation of the SSS in a third segment of the third symbol. The third segment is separated from the first segment by a second segment. The method further comprises determining, for the second segment, a second interpolation between the first channel estimation/the first interpolation in the first segment and the second channel estimation of the SSS in the third segment. The final channel estimation of PBCH is determined based further on the second interpolation.

In an embodiment of the disclosure, determining the second channel estimation comprises determining a second channel estimation of the PSS in an intermediate segment of a fourth symbol in the second at least one symbol. The intermediate segment is arranged between two opposing segments of the fourth symbol. The method further comprises determining, for at least one of the two opposing segments, an extrapolation of the second channel estimation of the PSS in the intermediate segment. The final channel estimation of PBCH is determined based further on the extrapolation.

According to a second aspect of the disclosure, there is provided a receiver device. The receiver device comprises at least one processor and at least one memory. The at least one memory contains instructions executable by the at least one processor, whereby the receiver device is operative to determine a first channel estimation of DMRS from a transmitter device. The receiver device is further operative to determine a second channel estimation of one or more synchronization related reference signals from the transmitter device. The receiver device is further operative to determine a final channel estimation of a broadcast channel from the transmitter device based at least on the first and second channel estimations.

In an embodiment of the disclosure, the receiver device is operative to perform the method according to the above first aspect.

According to a third aspect of the disclosure, there is provided a computer program product. The computer program product comprises instructions which when executed by at least one processor, cause the at least one processor to perform the method according to the above first aspect.

According to a fourth aspect of the disclosure, there is provided a computer readable storage medium. The computer readable storage medium comprises instructions which when executed by at least one processor, cause the at least one processor to perform the method according to the above first aspect.

According to a fifth aspect of the disclosure, there is provided a receiver device. The receiver device comprises a first determination module for determining a first channel estimation of DMRS from a transmitter device. The receiver device further comprises a second determination module for determining a second channel estimation of one or more synchronization related reference signals from the transmitter device. The receiver device further comprises a third determination module for determining a final channel estimation of a broadcast channel from the transmitter device based at least on the first and second channel estimations.

According to a sixth aspect of the disclosure, there is provided a method implemented in a communication system including a host computer, a base station and a UE. The method comprises, at the host computer, providing user data. The method further comprises, at the host computer, initiating a transmission carrying the user data to the UE via a cellular network comprising the base station. The UE determines a first channel estimation of DMRS from the base station. The UE determines a second channel estimation of one or more synchronization related reference signals from the transmitter device. The UE determines a final channel estimation of a broadcast channel from the transmitter device based at least on the first and second channel estimations.

In an embodiment of the disclosure, the method further comprises, at the UE, receiving the user data from the base station.

According to a seventh aspect of the disclosure, there is provided a communication system including a host computer. The host computer comprises processing circuitry configured to provide user data and a communication interface configured to forward user data to a cellular network for transmission to a UE. The UE comprises a radio interface and processing circuitry. The UE's processing circuitry is configured to determine a first channel estimation of DMRS from the base station. The UE's processing circuitry is further configured to determine a second channel estimation of one or more synchronization related reference signals from the transmitter device. The UE's processing circuitry is further configured to determine a final channel estimation of a broadcast channel from the transmitter device based at least on the first and second channel estimations.

In an embodiment of the disclosure, the communication system further includes the UE.

In an embodiment of the disclosure, the cellular network further includes a base station configured to communicate with the UE.

In an embodiment of the disclosure, the processing circuitry of the host computer is configured to execute a host application, thereby providing the user data. The UE's processing circuitry is configured to execute a client application associated with the host application.

According to some embodiment(s) of the disclosure, the channel estimation processing gain can be improved for demodulation of a broadcast channel.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
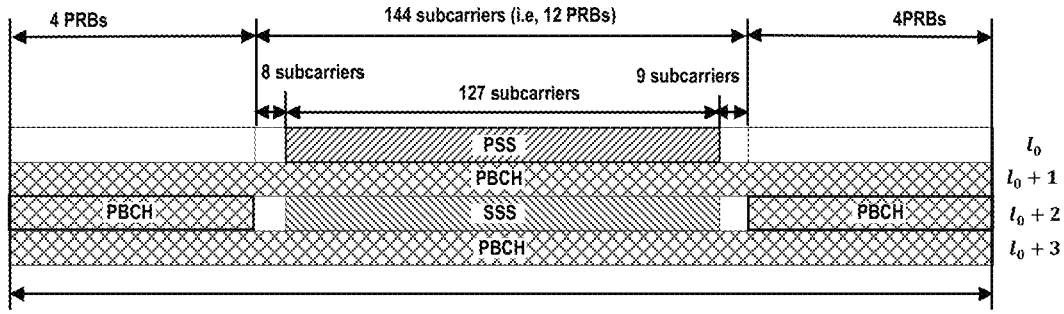
FIG. 1 is a diagram showing an SS block in NR.
Figure 2:
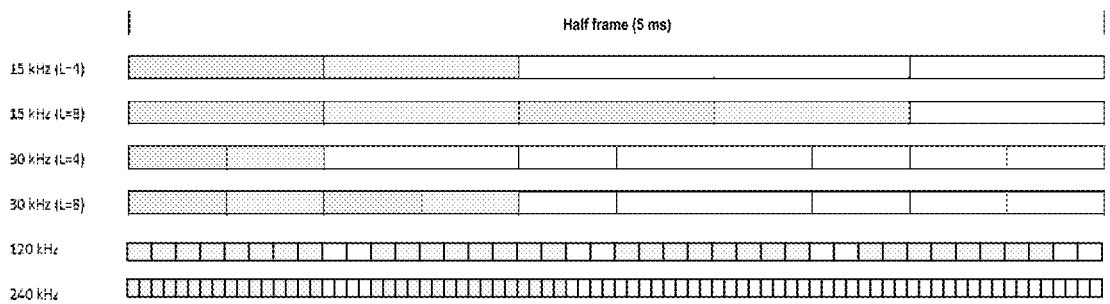
FIG. 2 is a diagram showing the transmission of an SS burst set.
Figure 3:
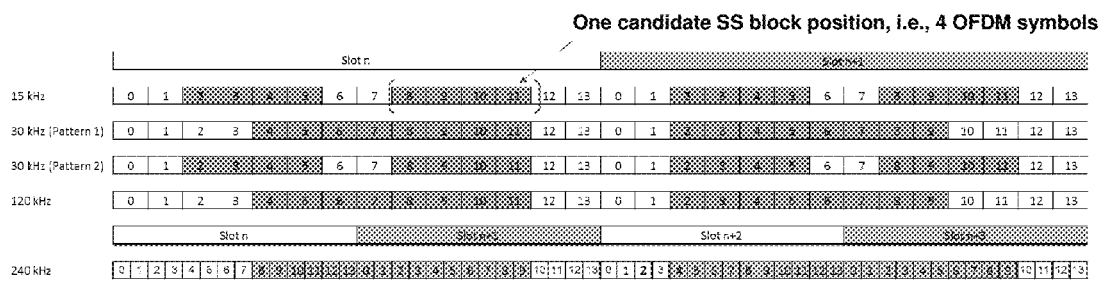
FIG. 3 is a diagram showing the transmission of SS blocks in slots.

In LTE, cell-specific reference signal (CRS) is used to do the channel estimation of PBCH. For ultra lean design, there is no always existing reference signal, such as CRS, in NR. The traditional way is using a reference signal such as demodulation reference signal (DMRS) to do the channel estimation. In NR, the PBCH has irregular distribution, as shown in FIG. 1. There are two short segments of PBCH in symbol $l_0+2$. In each short segment there are 4 physical resource blocks (PRBs). The DMRS for PBCH is evenly distributed in the physical resource of PBCH. Its density is ¼ per PRB per OFDM symbol, which means in each symbol and each PRB, there is 1 DMRS resource element (RE) in every 4 REs.

Since the distribution of PBCH in NR is irregular and it is discontinuous in symbol $l_0+2$, it is hard to estimate the channel in symbol $l_0+2$ accurately for channel estimation. The traditional method is to treat the channel in the 3 symbols is the same one as the averaged channel estimation between symbol $l_0+1$ and $l_0+3$. The average could reduce the noise variance and increase the channel processing gain, but the performance of PBCH with the traditional method using DMRS only may be not good enough for PBCH demodulation.

The present disclosure proposes improved solutions for channel estimation of PBCH. These solutions may be applied to a wireless communication system including a terminal device and a base station. The terminal device can communicate through a radio access communication link with the base station. The base station can provide radio access communication links to terminal devices that are within its communication service cell. The base station may be, for example, a gNB in NR. Note that the communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 4:
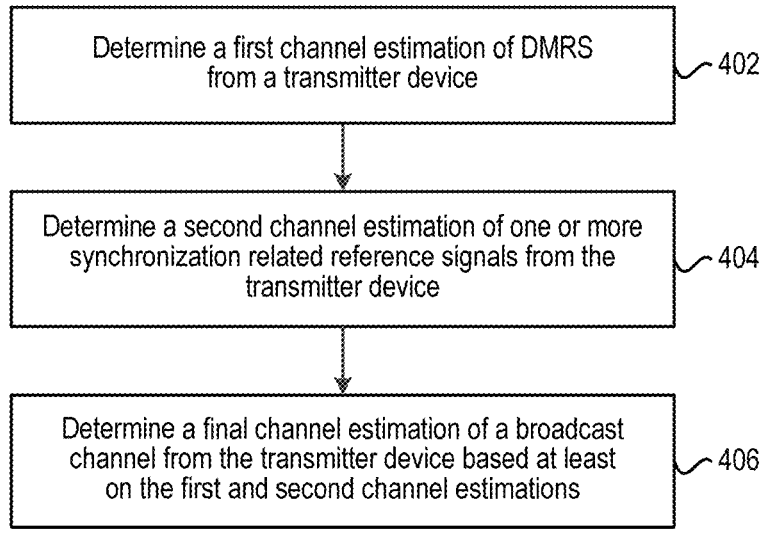
FIG. 4 is a flowchart illustrating a method implemented at a receiver device according to an embodiment of the disclosure.

Hereinafter, the solutions will be described in detail with reference to FIGS. 4-16. FIG. 4 is a flowchart illustrating a method implemented at a receiver device according to an embodiment of the disclosure. At block 402, a first channel estimation of demodulation reference signal (DMRS) from a transmitter device is determined. Here, the term "channel estimation" refers to channel estimation result which may include one or more channel estimation values. Various techniques for channel estimation, such as discrete Fourier transform (DFT) based channel estimation, may be used to calculate the first channel estimation. As the first option, the receiver device may be a terminal device and the transmitter device may be a base station. As the second option, the receiver device is a base station and the transmitter device is another base station.

At block 404, a second channel estimation of one or more synchronization related reference signals from the transmitter device is determined. Similar to bock 402, various techniques for channel estimation may be used to calculate the second channel estimation. In the above first option, the one or more synchronization related reference signals may be at least one of primary synchronization signal (PSS) and secondary synchronization signal (SSS). That is, there may be three examples. As the first example, the second channel estimation of PSS may be determined. As the second example, the second channel estimation of SSS may be determined. As the third example, the second channel estimation of PSS and the second channel estimation of SSS may be determined. In the above second option, the one or more synchronization related reference signals may be those used in direct communication scenarios such as device-to-device (D2D), vehicle-to-everything (V2X), or the like.

At block 406, a final channel estimation of a broadcast channel from the transmitter device is determined based at least on the first and second channel estimations. In the above first option, the broadcast channel may be physical broadcast channel (PBCH). The PSS/SSS and DMRS may be jointly used to do channel estimation for PBCH demodulation. For instance, block 406 may be implemented as blocks 506-1 and 506-2 of FIG. 5, which will be described in detail later. In the above second option, the broadcast channel may be physical sidelink broadcast channel (PSBCH). Block 406 in the second option may be implemented in a way similar to blocks 506-1 and 506-2. Since the second channel estimation is used in addition to the first channel estimation, in the case where the broadcast channel is irregularly distributed, the channel estimation processing gain can be improved for the demodulation of the broadcast channel.

Figure 5:
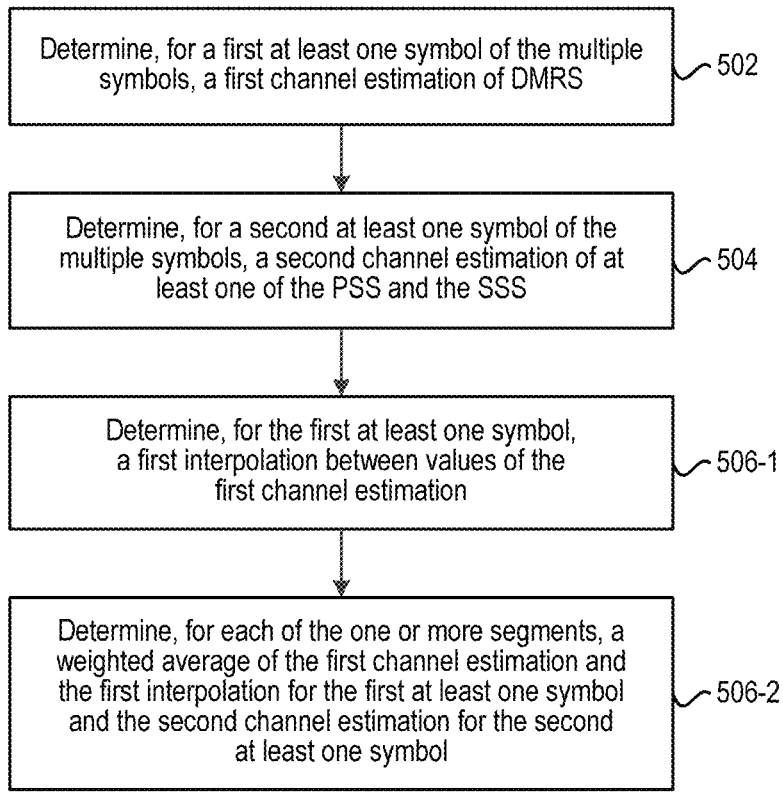
FIG. 5 is a flowchart illustrating a method implemented at a receiver device according to another embodiment of the disclosure.
Figure 6:
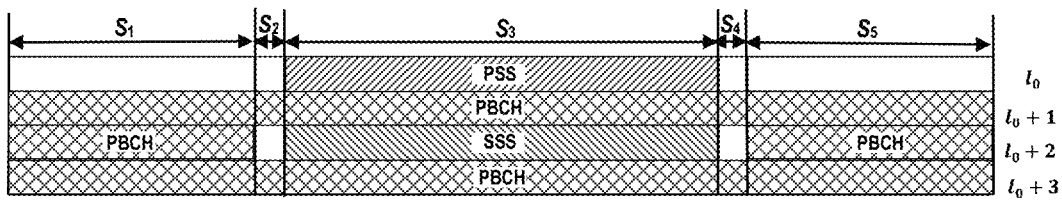
FIG. 6 is a diagram showing an example for explaining the method of FIG. 5.

FIG. 5 is a flowchart illustrating a method implemented at a receiver device according to another embodiment of the disclosure. This embodiment corresponds to the above first option where the PSS, the SSS and the PBCH may be contained in a signal block for cell searching, such as synchronization signal block (SSB) in NR. The signal block for cell searching may comprise multiple symbols in time domain and each of the multiple symbols can be divided into one or more segments in the same manner in frequency domain. For instance, in the example shown in FIG. 6, the SSB in NR contains 4 symbols $l_0$, $l_0+1$, $l_0+2$, $l_0+3$. For each of these 4 symbols, the SSB can be divided into 5 segments $S_1, S_2, S_3, S_4, S_5$. Hereinafter, the method of FIG. 5 will be described with reference to this example. Those skilled in the art can understand that the principle of the present disclosure may also be applied to any other suitable signal block for cell searching.

At block 502, the terminal device determines, for a first at least one symbol of the multiple symbols, a first channel estimation of DMRS. The first at least one symbol may be any one or more of the symbols on which DMRS is arranged. In the example shown in FIG. 6, the first at least one symbol may be any one or more of $l_0+1$, $l_0+2$, $l_0+3$. For symbol $l_0+1$ and $l_0+3$, the whole PBCH part can be estimated accurately. For symbol $l_0+2$, the PBCH parts on $S_1$ and $S_s$ can be estimated accurately.

At block 504, the terminal device determines, for a second at least one symbol of the multiple symbols, a second channel estimation of at least one of the PSS and the SSS. The second at least one symbol may be any one or more of the symbols on which PSS and/or SSS is arranged. Thus, the first at least one symbol and the second at least one symbol may overlap with each other (share a common symbol) or are different with each other. In the example shown in FIG. 6, the second at least one symbol may be any one or more of $l_0$ and $l_0+2$. For symbol $l_0$, the PSS part on $S_3$ can be estimated accurately as the PSS covers this area. For symbol $l_0+2$, the SSS part on $S_3$ can be estimated accurately as the SSS covers this area. Suppose the first at least one symbol are $l_0+1$, $l_0+2$, $l_0+3$ and the second at least one symbol are $l_0$ and $l_0+2$. Then, 4 independent channel estimations, $H_{l_0+l}$, $l=0, \ldots 3$ can be obtained on symbols $l_0$, $l_0+1$, $l_0+2$, $l_0+3$ respectively.

At block 506-1, the terminal device determines, for the first at least one symbol, a first interpolation between values of the first channel estimation. Since the DMRS is interleaved with PBCH data, the first interpolation is needed to get a channel estimation on the resource elements (REs) for PBCH data. Various interpolation techniques (such as first-order linear interpolation, second order interpolation, etc.) may be used to calculate the first interpolation.

At block 506-2, the terminal device determines, for each of the one or more segments, a weighted average of the first channel estimation and the first interpolation for the first at least one symbol and the second channel estimation for the second at least one symbol. As an example, each of a weight for the first channel estimation/the first interpolation and a weight for the second channel estimation may equal to one divided by a size of a union set of the first at least one symbol and the second at least one symbol. In the example shown in FIG. 6, suppose the first at least one symbol are $l_0+1$, $l_0+2$, $l_0+3$ and the second at least one symbol are $l_0$ and $l_0+2$. Then, the union set is $\{l_0, l_0+1, l_0+2, l_0+3\}$ and its size is 4. Thus, the weight for the first channel estimation/the first interpolation (=¼) equals the weight for the second channel estimation (=¼). For $S_3$, the weighted average may be calculated as ¼ multiplied by a sum of the following: the channel estimation of the PSS part on $S_3$ of $l_0$, the channel estimation of the PBCH part on $S_3$ of $l_0+1$, the channel estimation of the SSS part on $S_3$ of $l_0+2$, and the channel estimation of the PBCH part on $S_3$ of $l_0+3$. The weighted averages for other segments may be calculated similarly. In this way, the channel estimation of the SSB can be averaged in time domain to reduce the noise variance and increase the processing gain of the channel estimation.

As another example, a weight for the first channel estimation/the first interpolation corresponding to a segment of a symbol in the first at least one symbol may be based on a density of DMRS in the segment and an amplitude of DMRS in the segment. A weight for the second channel estimation corresponding to a segment of a symbol in the second at least one symbol may be based on a density of PSS or SSS in the segment and an amplitude of PSS or SSS in the segment. In the example shown in FIG. 6, the RS density is different in different area of the SSB. In the PBCH part, the RS density is ¼, i.e. there is 1 DMRS RE in every 4 REs per symbol per PRB. While in the PSS/SSS part, the RS density is 1. The denser the reference signals are distributed, the more accurate and reliable channel estimation is. Thus, in this example, to get more accurate channel, when combining the channel estimation results of the 4 symbols in time domain, different weights are used. For more accurate channel the weights may be larger. The principle of calculating the combining weights is that the denser the RSs are distributed, the larger the weight will be; and the higher the amplitude of the RS is, the larger the weight is.

There may be various ways for calculating the weights according to the above criteria. For instance, a weight for the first channel estimation/the first interpolation corresponding to a segment of a symbol in the first at least one symbol may equal to a ratio between a sum of amplitudes of all DMRS in the segment of the symbol and a sum of amplitudes of all reference signals in the segment of the first at least one symbol and the second at least one symbol. A weight for the second channel estimation corresponding to a segment of a symbol in the second at least one symbol may equal to a ratio between a sum of amplitudes of all PSS or SSS in the segment of the symbol and a sum of amplitudes of all reference signals in the segment of the first at least one symbol and the second at least one symbol. That is, the weight may be represented as:

$$w_{s,l} = \frac{\sum_{n=0}^{N_{s,l}-1} |rs_{n,l}|}{\sum_{l=0/1}^{3} \sum_{n=0}^{N_{s,l}-1} |rs_{n,l}|}$$

where s is the segment index, l is the symbol index, n is the RS index in each segment, $N_{s,l}$ is the total number of RS in segment s, symbol l, $rs_{n,l}$ is the value of the nth RS in segment s, symbol l. Since the combining weights could be different between different segments in frequency domain, the differentiated weights could increase the robustness of combining channel estimation between symbols.

For example, to get the PBCH channel estimation by jointly using SSS and DMRS, the weights may be calculated as:

$w_{1,1}=w_{1,2}=w_{1,3}=12/(12+12+12)$ $w_{2,1}=w_{2,3}=2/(2+0+2), w_{2,2}=0$ $w_{3,1}=w_{3,3}=32/(127+32+32), w_{3,2}=127/(127+32+32)$ $w_{4,1}=w_{4,3}=2/(2+0+2), w_{4,2}=0$ $w_{5,1}=w_{5,2}=w_{5,3}=12/(12+12+12)$.

For instance, $w_{1,1}$ is the weight for $S_1$ of $l_0+1$. Since the the RS density is ¼ and there are 4 PRBs (48 REs) in $S_1$ of $l_0+1$, the number of RS (DMRS) in $S_1$ of $l_0+1$ equals to 48*¼=12. In the above calculation, the amplitude of the RS is supposed to be 1. Thus, the numerator can be calculated as 12. For jointly using PSS, SSS and DMRS, the weights may be calculated as:

$w_{1,0}=w_{2,0}=w_{4,0}=w_{5,0}=0$, $w_{3,0}=w_{3,2}=127/(127*2+32*2)$, $w_{3,1}=w_{3,3}=32/(127*2+32*2)$, and other weights are same as jointly using SSS and DMRS. For each segment, the channel estimation combining is as $H_s = \sum_{l=0/1}^{3} w_{s,1} * H_{s,l}$, for jointly using SSS, l starts from 1, for joint using both PSS and SSS, l starts from 0. The final channel estimation for PBCH demodulation is the concatenation of each segment:

$H_{l_0+1} = H_{l_0+2} = H_{l_0+3} = [H_1 H_2 H_3 H_4 H_5]$.

Optionally, the terminal device may adjust a weight for the first channel estimation/the first interpolation and a weight for the second channel estimation based on a mobile status of the terminal device. For example, if the moving speed of the terminal device is relatively low, PSS, SSS and DMRS are jointly used. If the moving speed of the terminal device is relatively high, SSS and DMRS are jointly used. Note that there may be other suitable configurations about the dynamic adjustment of the weights.

Figure 7A:
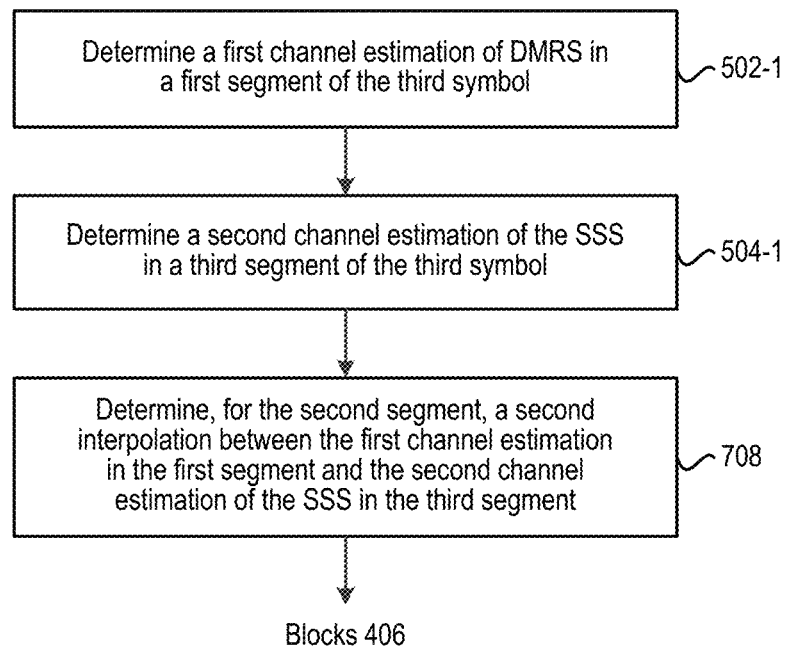
FIGS. 7A-7B are flowcharts each illustrating a method implemented at a receiver device according to another embodiment of the disclosure.

FIG. 7A is a flowchart illustrating a method implemented at a receiver device according to another embodiment of the disclosure. This embodiment also corresponds to the above first option. In this embodiment, the first at least one symbol and the second at least one symbol share a common third symbol. In the example shown in FIG. 6, suppose the first at least one symbol are $l_0+1$, $l_0+2$, $l_0+3$ and the second at least one symbol are $l_0$ and $l_0+2$. Then, symbol $l_0+2$ is the third symbol. At block 502-1, the terminal device determines a first channel estimation of DMRS in a first segment of the third symbol. In the example shown in FIG. 6, the first segment of the third symbol may be $S_1$ or $S_s$ of symbol $l_0+2$. At block 504-1, the terminal device determines a second channel estimation of the SSS in a third segment of the third symbol. The third segment is separated from the first segment by a second segment. In the example shown in FIG. 6, the third segment of the third symbol may be $S_2$ of symbol $l_0+2$. Thus, the second segment may be $S_2$ or $S_4$ of symbol $l_0+2$. At block 708, the terminal device determines, for the second segment, a second interpolation between the first channel estimation/the first interpolation in the first segment and the second channel estimation of the SSS in the third segment. In the example shown in FIG. 6, the channel estimation in $S_2$ can be obtained from the channel estimations in $S_1$ and $S_3$ via interpolation. The channel estimation in $S_4$ can be obtained from the channel estimations in $S_3$ and $S_s$ via interpolation. Then, block 406 is performed in which the final channel estimation of PBCH is determined based further on the second interpolation. For example, the second interpolation may also be taken as an input to the weighted averaging operation at block 506-2.

Figure 7B:
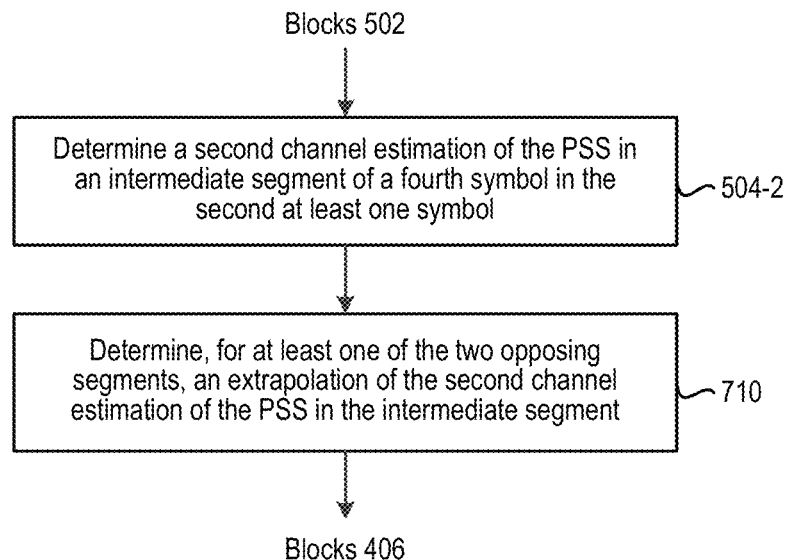

FIG. 7B is a flowchart illustrating a method implemented at a receiver device according to another embodiment of the disclosure. This embodiment also corresponds to the above first option. At block 504-2, the terminal device determines a second channel estimation of the PSS in an intermediate segment of a fourth symbol in the second at least one symbol. The intermediate segment is arranged between two opposing segments of the fourth symbol. In the example shown in FIG. 6, the intermediate segment of a fourth symbol is $S_3$ of symbol $l_0$. The two opposing segments are $S_1+S_2$ and $S_4+S_5$ of symbol $l_0$. At block 710, the terminal device determines, for at least one of the two opposing segments, an extrapolation of the second channel estimation of the PSS in the intermediate segment. In the example shown in FIG. 6, the other part of symbol $l_0$ may be estimated by extrapolation of $S_3$. Note that this channel estimation by using extrapolation might be not accurate if the channel varies quite much in frequency area. Also Note that the above implementing details described with respect to FIGS. 5-8 may apply, mutatis mutandis, to the above second option as can be understood by those skilled in the art.

Link level simulations were done with assumptions given in table 1 for comparing the weighted methods described above to the traditional solutions.

TABLE 1

Simulation parameter configurations

| Parameter | Value |
| --- | --- |
| Carrier Frequency | 3.5 GHz |
| Subcarrier spacing | 30 kHz |
| Channel Model | TDL-A, 100 ns |
| UE speed | 30 km/h |
| # of Tx/Rx | 1/2 |
| PBCH channel coding | Polar code |
| Synchronization | Ideal Synchronization |
| Channel estimation | Practical, based on DMRS only/SSS + DMRS/ PSS + SSS + DMRS |
| PBCH payload size including CRC | 56 bits (including 24 bits CRC) |

Figure 8:
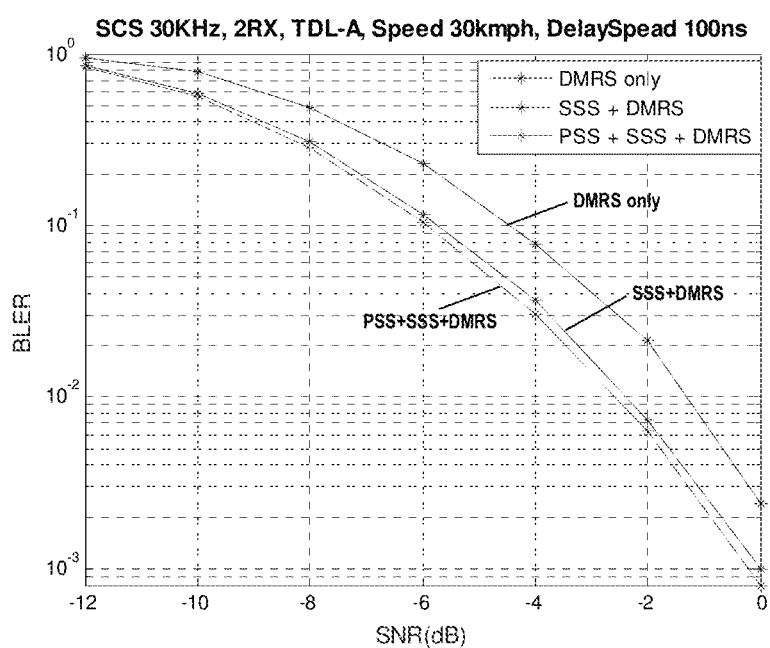
FIG. 8 is a diagram showing a performance comparison between different channel estimation methods.

FIG. 8 is a diagram showing PBCH BLER performance comparison between different channel estimation methods. As shown in FIG. 8, the performance of PBCH with the traditional method using DMRS only is not good since the SNR is around −4.5 dB at 10% block error rate (BLER). The joint usage of PSS/SSS and DMRS for channel estimation has the lowest BLER and the traditional method using DMRS only has the highest BLER. Compared to the method with only DMRS for channel estimation, the method via joint usage of SSS and DMRS and via joint usage of PSS/SSS and DMRS for channel estimation can provide 1.3 dB to 1.5 dB gain respectively. Thus, the BLER of PBCH outperforms the DMRS-only method about 1.3~1.5 dB.

Figure 9:
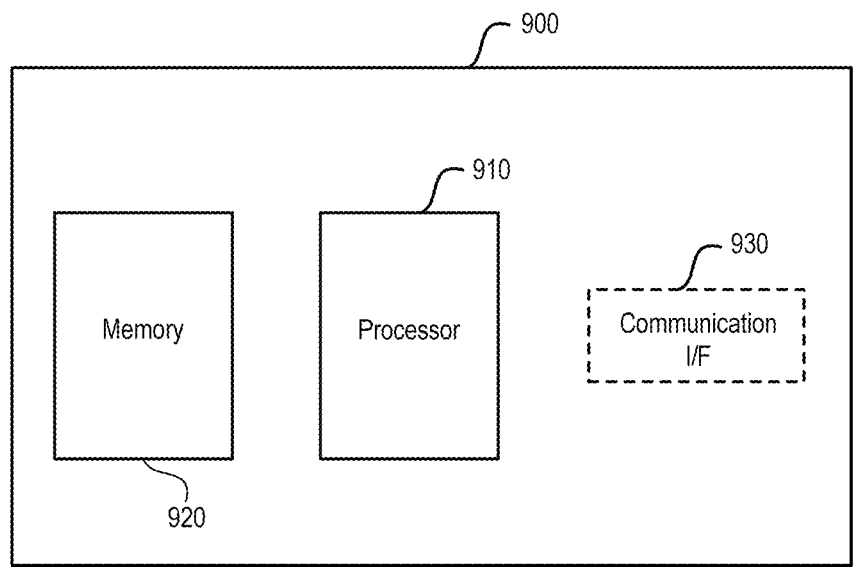
FIG. 9 is a block diagram showing an apparatus suitable for use in practicing some embodiments of the disclosure.

FIG. 9 is a block diagram showing an apparatus suitable for use in practicing some embodiments of the disclosure. For example, any one of the terminal device and the base station described above may be implemented through the apparatus 900. As shown, the apparatus 900 may include a processor 910, a memory 920 that stores a program, and optionally a communication interface 930 for communicating data with other external devices through wired and/or wireless communication.

The program includes program instructions that, when executed by the processor 910, enable the apparatus 900 to operate in accordance with the embodiments of the present disclosure, as discussed above. That is, the embodiments of the present disclosure may be implemented at least in part by computer software executable by the processor 910, or by hardware, or by a combination of software and hardware.

The memory 920 may be of any type suitable to the local technical environment and may be implemented using any suitable data storage technology, such as semiconductor based memory devices, flash memories, magnetic memory devices and systems, optical memory devices and systems, fixed memories and removable memories. The processor 910 may be of any type suitable to the local technical environment, and may include one or more of general purpose computers, special purpose computers, microprocessors, digital signal processors (DSPs) and processors based on multi-core processor architectures, as non-limiting examples.

Figure 10:
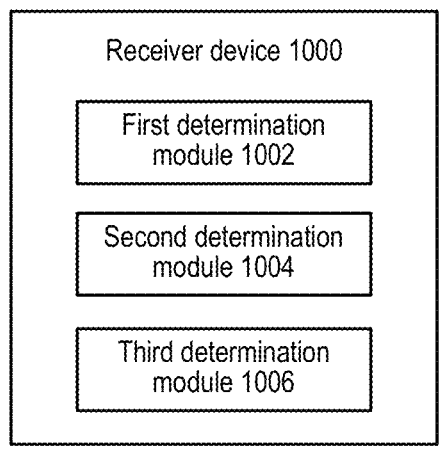
FIG. 10 is a block diagram showing a receiver device according to an embodiment of the disclosure.

FIG. 10 is a block diagram showing a receiver device according to an embodiment of the disclosure. As shown, the receiver device 1000 comprises a first determination module 1002, a second determination module 1004 and a third determination module 1006. The first determination module 1002 may be configured to determine a first channel estimation of DMRS from a transmitter device, as described above with respect to block 402. The second determination module 1004 may be configured to determine a second channel estimation of one or more synchronization related reference signals from the transmitter device, as described above with respect to block 404. The third determination module 1006 may be configured to determine a final channel estimation of a broadcast channel from the transmitter device based at least on the first and second channel estimations, as described above with respect to block 406. The modules described above may be implemented by hardware, or software, or a combination of both.

Figure 11:
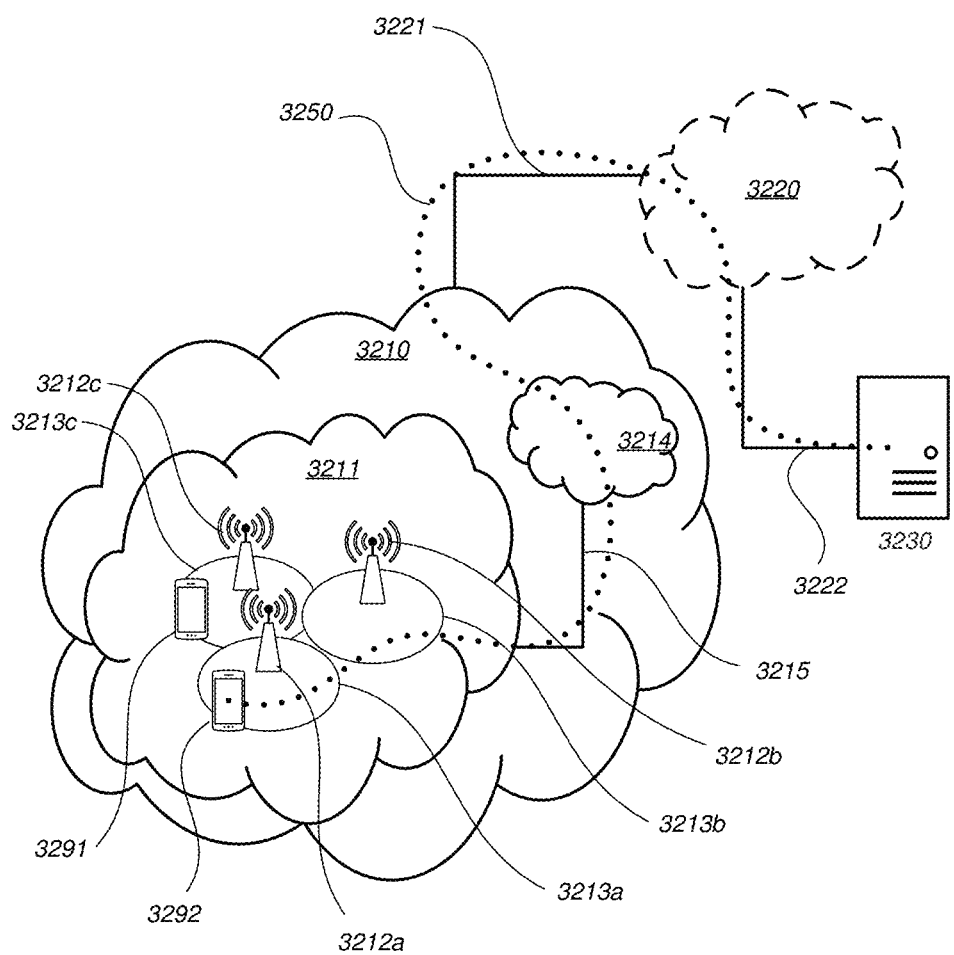
FIG. 11 is a diagram showing a telecommunication network connected via an intermediate network to a host computer in accordance with some embodiments.

With reference to FIG. 11, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 11 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 12) served by base station 3320. Communication interface 3326 may be configured to facilitate connection 3360 to host computer 3310. Connection 3360 may be direct or it may pass through a core network (not shown in FIG. 12) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 12:
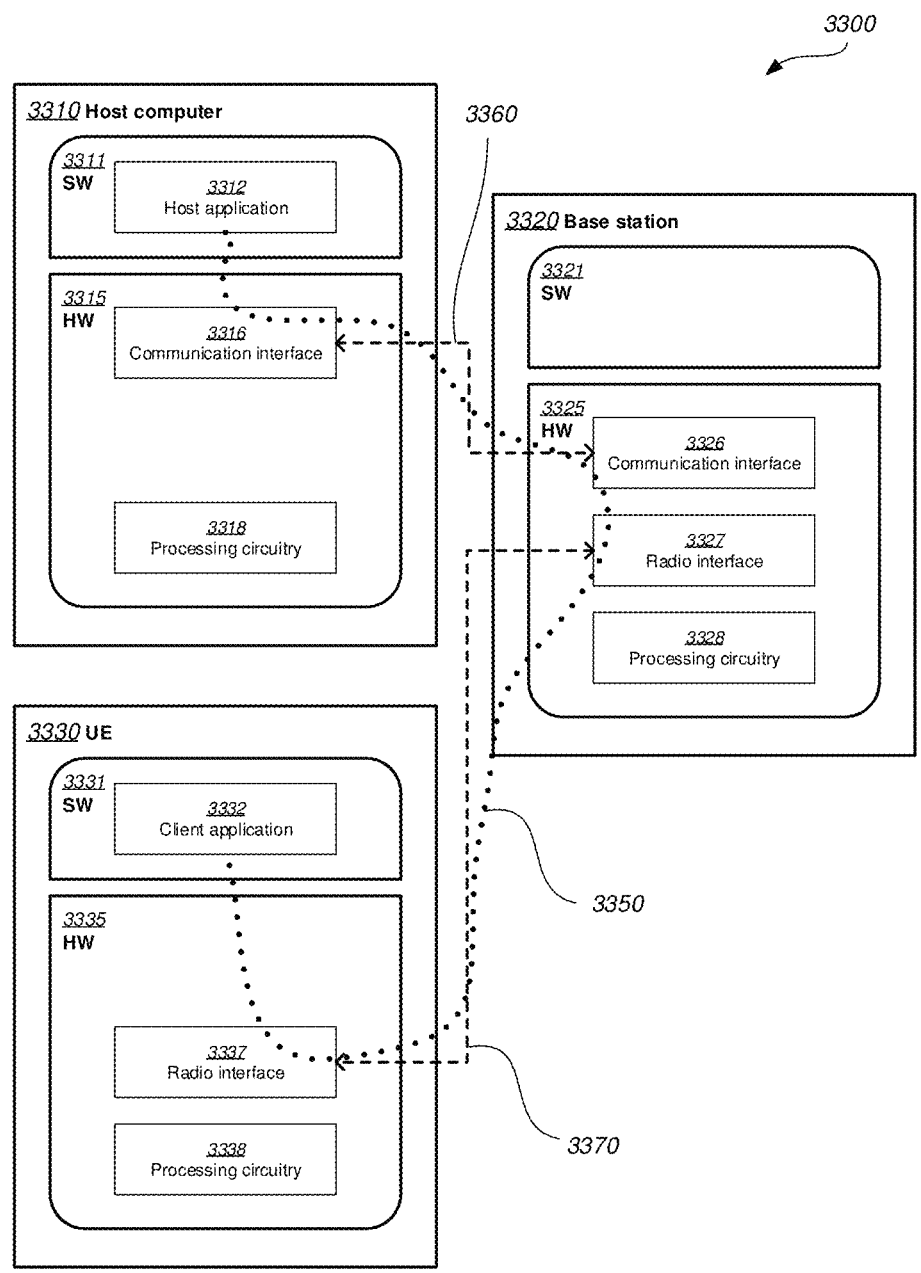
FIG. 12 is a diagram showing a host computer communicating via a base station with a user equipment in accordance with some embodiments.

It is noted that host computer 3310, base station 3320 and UE 3330 illustrated in FIG. 12 may be similar or identical to host computer 3230, one of base stations 3212a, 3212b, 3212c and one of UEs 3291, 3292 of FIG. 11, respectively. This is to say, the inner workings of these entities may be as shown in FIG. 12 and independently, the surrounding network topology may be that of FIG. 11.

In FIG. 12, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 13:
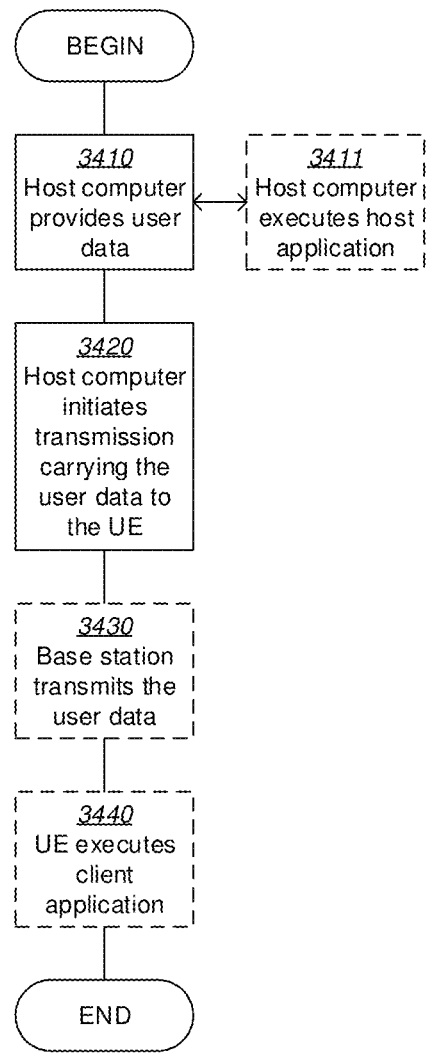
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 14:
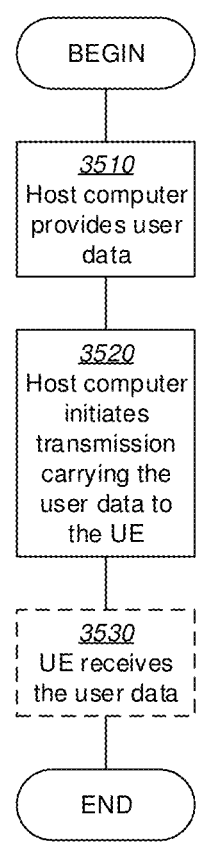
FIG. 14 is a flowchart illustrating a methods implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 15:
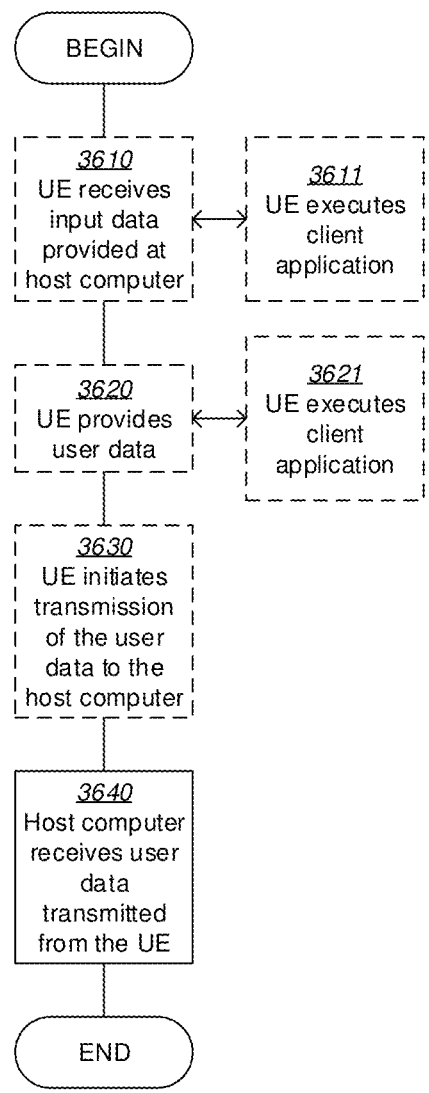
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 16:
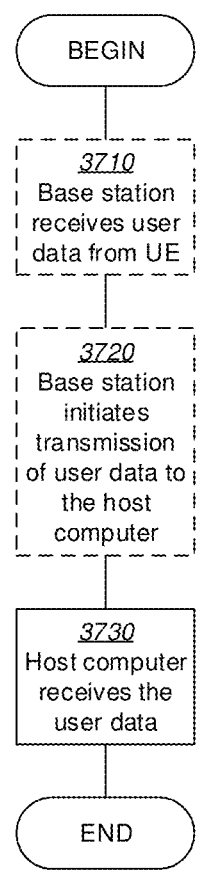
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a receiver device, the method comprising:
   determining a first channel estimation of a demodulation reference signal ("DMRS") from a transmitter device;
   determining a second channel estimation of one or more synchronization related reference signals from the transmitter device; and
   determining a final channel estimation of a broadcast channel from the transmitter device based at least on the first channel estimation and the second channel estimation,
   wherein the one or more synchronization related reference signals and the broadcast channel are part of a signal block for cell searching,
   wherein the signal block for cell searching comprises multiple symbols in time domain and each of the multiple symbols can be divided into one or more segments in the same manner in frequency domain,
   wherein determining the first channel estimation comprises determining, for a first at least one symbol of the multiple symbols, a first channel estimation of the DMRS, and
   wherein determining the second channel estimation comprises determining, for a second at least one symbol of the multiple symbols, a second channel estimation of at least one of the one or more synchronization related signals.

2. The method of claim 1, wherein the receiver device is a base station and the transmitter device is another base station, and
   wherein the broadcast channel is a physical sidelink broadcast channel ("PSBCH").

3. The method of claim 1, wherein the receiver device is a terminal device and the transmitter device is a base station,
   wherein the one or more synchronization related reference signals are at least one of a primary synchronization signal ("PSS") and a secondary synchronization signal ("SSS"), and
   wherein the broadcast channel is a physical broadcast channel ("PBCH").

4. The method of claim 3, wherein the signal block for cell searching is a synchronization signal block ("SSB") in new radio ("NR").

5. The method of claim 3, wherein determining the final channel estimation comprises:
   determining, for the first at least one symbol, a first interpolation between values of the first channel estimation; and
   determining, for each of the one or more segments, a weighted average of the first channel estimation and the first interpolation for the first at least one symbol and the second channel estimation for the second at least one symbol.

6. The method of claim 1, wherein the first at least one symbol and the second at least one symbol overlap with each other or are different with each other.

7. The method of claim 5, wherein each of a weight for the first channel estimation/the first interpolation and a weight for the second channel estimation equals to one divided by a size of a union set of the first at least one symbol and the second at least one symbol.

8. The method of claim 5, wherein a weight for the first channel estimation/the first interpolation corresponding to a segment of a symbol in the first at least one symbol is based on a density of the DMRS in the segment and an amplitude of the DMRS in the segment, and
   wherein a weight for the second channel estimation corresponding to a segment of a symbol in the second at least one symbol is based on a density of the PSS or the SSS in the segment and an amplitude of the PSS or the SSS in the segment.

9. The method of claim 8, wherein a weight for the first channel estimation/the first interpolation corresponding to a segment of a symbol in the first at least one symbol equals to a ratio between a sum of amplitudes of all DMRS in the segment of the symbol and a sum of amplitudes of all reference signals in the segment of the first at least one symbol and the second at least one symbol, and
   wherein a weight for the second channel estimation corresponding to a segment of a symbol in the second at least one symbol equals to a ratio between a sum of amplitudes of all PSS or SSS in the segment of the symbol and a sum of amplitudes of all reference signals in the segment of the first at least one symbol and the second at least one symbol.

10. The method of claim 5, wherein determining the weighted average comprises:
    adjusting a weight for the first channel estimation/the first interpolation and a weight for the second channel estimation based on a mobile status of the terminal device.

11. The method of claim 5, wherein the first at least one symbol and the second at least one symbol share a common third symbol,
    wherein determining the first channel estimation comprises determining a first channel estimation of the DMRS in a first segment of the third symbol,
    wherein determining the second channel estimation comprises determining a second channel estimation of the SSS in a third segment of the third symbol, the third segment being separated from the first segment by a second segment,
    the method further comprising:
      determining, for the second segment, a second interpolation between the first channel estimation/the first interpolation in the first segment and the second channel estimation of the SSS in the third segment, and
    wherein the final channel estimation of the PBCH is determined based further on the second interpolation.

12. The method of claim 5, wherein determining the second channel estimation comprises determining a second channel estimation of the PSS in an intermediate segment of a fourth symbol in the second at least one symbol, the intermediate segment being arranged between two opposing segments of the fourth symbol, the method further comprising:
determining, for at least one of the two opposing segments, an extrapolation of the second channel estimation of the PSS in the intermediate segment, and wherein the final channel estimation of the PBCH is determined based further on the extrapolation.

13. A receiver device comprising:
processing circuitry; and
memory coupled to the processing circuitry and having instructions stored therein that are executable by the processing circuitry to cause the receiver device to perform operations comprising:
determining a first channel estimation of a demodulation reference signal ("DMRS") from a transmitter device;
determining a second channel estimation of one or more synchronization related reference signals from the transmitter device; and
determining a final channel estimation of a broadcast channel from the transmitter device based at least on the first channel estimation and the second channel estimation,
wherein the one or more synchronization related reference signals and the broadcast channel are part of a signal block for cell searching that comprises multiple symbols,
wherein determining the first channel estimation comprises determining, for a first at least one symbol of the multiple symbols, a first channel estimation of the DMRS, and
wherein determining the second channel estimation comprises determining, for a second at least one symbol of the multiple symbols, a second channel estimation of at least one of the one or more synchronization related signals.

14. The receiver device of claim 13, wherein the receiver device is a base station and the transmitter device is another base station, and
wherein the broadcast channel is a physical sidelink broadcast channel ("PSBCH").

15. The receiver device of claim 13, wherein the receiver device is a terminal device and the transmitter device is a base station,
wherein one or more synchronization related reference signals are at least one of primary synchronization signal ("PSS") and secondary synchronization signal ("SSS"), and
wherein the broadcast channel is physical broadcast channel ("PBCH").

16. The receiver device of claim 15, wherein the PSS, the SSS and the PBCH are contained in lithe signal block for cell searching.

17. A non-transitory computer readable medium having instructions stored therein that are executable by processing circuitry of a receiver device to cause the receiver device to perform operations comprising:
determining a first channel estimation of a demodulation reference signal ("DMRS") from a transmitter device;
determining a second channel estimation of one or more synchronization related reference signals from the transmitter device; and
determining a final channel estimation of a broadcast channel from the transmitter device based at least on the first channel estimation and the second channel estimation,
wherein the one or more synchronization related reference signals and the broadcast channel are part of a signal block for cell searching, and
wherein the signal block for cell searching comprises multiple symbols in time domain and each of the multiple symbols can be divided into one or more segments in the same manner in frequency domain,
wherein determining the first channel estimation comprises determining, for a first at least one symbol of the multiple symbols, a first channel estimation of the DMRS,
wherein determining the second channel estimation comprises determining, for a second at least one symbol of the multiple symbols, a second channel estimation of the one or more synchronization related signals, and
wherein determining the final channel estimation comprises:
determining, for the first at least one symbol, a first interpolation between values of the first channel estimation; and
determining, for each of the one or more segments, a weighted average of the first channel estimation and the first interpolation for the first at least one symbol and the second channel estimation for the second at least one symbol.

18. The receiver device of claim 14, wherein the signal block for cell searching is a synchronization signal block ("SSB") in new radio ("NR").

19. The receiver device of claim 14, wherein the signal block for cell searching comprises the multiple symbols in time domain and each of the multiple symbols can be divided into one or more segments in the same manner in frequency domain,
and
wherein determining the final channel estimation comprises:
determining, for the first at least one symbol, a first interpolation between values of the first channel estimation; and
determining, for each of the one or more segments, a weighted average of the first channel estimation and the first interpolation for the first at least one symbol and the second channel estimation for the second at least one symbol.

20. The receiver device of claim 13, wherein the first at least one symbol and the second at least one symbol overlap with each other.

* * * * *